(12) United States Patent
Nishihashi et al.

(10) Patent No.: US 10,317,996 B2
(45) Date of Patent: Jun. 11, 2019

(54) OPERATION SYSTEM

(71) Applicant: DENSO CORPORATION, Kariya, Aichi-pref. (JP)

(72) Inventors: Shigeaki Nishihashi, Kariya (JP); Hiroyuki Kogure, Kariya (JP); Hideki Ito, Kariya (JP); Tetsuya Tomaru, Kariya (JP); Yoshiyuki Tsuda, Kariya (JP); Takuya Osugi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/554,844

(22) PCT Filed: Mar. 4, 2016

(86) PCT No.: PCT/JP2016/001199
§ 371 (c)(1),
(2) Date: Aug. 31, 2017

(87) PCT Pub. No.: WO2016/152047
PCT Pub. Date: Sep. 29, 2016

(65) Prior Publication Data
US 2018/0046246 A1    Feb. 15, 2018

(30) Foreign Application Priority Data

Mar. 25, 2015  (JP) .................... 2015-063292

(51) Int. Cl.
| | |
|---|---|
| *G06F 3/01* | (2006.01) |
| *G06F 3/14* | (2006.01) |
| *B60K 35/00* | (2006.01) |
| *B60K 37/06* | (2006.01) |
| *G06F 3/0482* | (2013.01) |

(52) U.S. Cl.
CPC .............. *G06F 3/013* (2013.01); *B60K 35/00* (2013.01); *B60K 37/06* (2013.01); *G06F 3/1423* (2013.01);

(Continued)

(58) Field of Classification Search
CPC ...... G06F 3/013; G06F 3/1423; G06F 3/0482; B60K 35/00; B60K 37/06;

(Continued)

(56) References Cited

U.S. PATENT DOCUMENTS 9,552,058 B2 *  1/2017  Shibata ................. B60K 35/00
9,942,966 B2 *  4/2018  Nolan ..................... G06F 3/013
(Continued)

FOREIGN PATENT DOCUMENTS

JP       2012006552 A     1/2012
JP         5588764 B2     9/2014
(Continued)

*Primary Examiner* — Nitin Patel
*Assistant Examiner* — Amy Onyekaba
(74) *Attorney, Agent, or Firm* — Harness, Dickey & Pierce, P.L.C.

(57) ABSTRACT

An operation system includes: an operation device manually operated by a user and inputting a command of an operation content to a command target apparatus selected from multiple apparatuses; a selection device selecting one apparatus as the command target apparatus according to multiple visual line regions individually set in relation to the apparatuses and a visual line direction of the user detected by a visual line detection sensor, the one device relating to one visual line region disposed in the visual line direction; and a selection maintaining device maintaining a selection state of the command target apparatus even when the visual line direction is changed to another direction pointing to none of the visual line regions while the command target apparatus is selected.

4 Claims, 4 Drawing Sheets

(52) U.S. Cl.
CPC ............ *B60K 2350/1008* (2013.01); *B60K 2350/1052* (2013.01); *B60K 2350/2013* (2013.01); *B60K 2350/352* (2013.01); *G06F 3/0482* (2013.01)

(58) Field of Classification Search
CPC .... B60K 2350/2013; B60K 2350/1052; B60K 2350/1008; B60K 2350/352; B60K 2350/1096; B60K 2350/928; B60R 16/027; B60R 1/12; B60R 2001/1223; B60R 2001/1215; G06K 9/00845
See application file for complete search history.

(56) References Cited

U.S. PATENT DOCUMENTS

| | | | | |
|---|---|---|---|---|
| 2009/0022368 | A1* | 1/2009 | Matsuoka | B60K 35/00 382/103 |
| 2010/0121645 | A1* | 5/2010 | Seitz | B60K 35/00 704/275 |
| 2010/0238280 | A1* | 9/2010 | Ishii | B60K 35/00 348/77 |
| 2010/0324779 | A1* | 12/2010 | Takahashi | B60K 37/06 701/36 |
| 2012/0198353 | A1* | 8/2012 | Lee | G06F 3/017 715/748 |
| 2013/0076881 | A1* | 3/2013 | Takahashi | G06K 9/00268 348/77 |
| 2014/0129082 | A1* | 5/2014 | Takahashi | B60R 1/12 701/36 |
| 2016/0170485 | A1 | 6/2016 | Naruse | |

FOREIGN PATENT DOCUMENTS

| | | |
|---|---|---|
| JP | 2014174598 A | 9/2014 |
| JP | 2014218199 A | 11/2014 |
| JP | 2016182856 A | 10/2016 |
| JP | 2016184238 A | 10/2016 |

* cited by examiner

OPERATION SYSTEM

CROSS REFERENCE TO RELATED APPLICATIONS

This application is a U.S. National Phase Application under 35 U.S.C. 371 of International Application No. PCT/JP2016/001199 filed on Mar. 4, 2016 and published in Japanese as WO 2016/152047 A1 on Sep. 29, 2016. This application is based on and claims the benefit of priority from Japanese Patent Application No. 2015-063292 filed on Mar. 25, 2015. The entire disclosures of all of the above applications are incorporated herein by reference.

TECHNICAL FIELD

The present disclosure relates to an operation system including an operation device associated with detection of a line of sight.

BACKGROUND ART

A line-of-sight detection sensor detecting a direction of a line of sight of a user has been under development in recent years (see Patent Literatures 1 and 2). The line-of-sight detection sensor allows a user wishing to make a device operate according to an intended content to give a command for the intended content to the device by merely turning a line of sight.

PRIOR ART LITERATURES

Patent Literature

Patent Literature 1: Japanese Patent No. 5588764
Patent Literature 2: JP-2014-174598

SUMMARY

It is an object of the present disclosure to provide an operation system which makes it easier for a user to give a command to an apparatus.

According to an aspect of the present disclosure, an operation system includes: an operation device that is manually operated by a user and inputs a command of an operation content to a command target apparatus selected from a plurality of apparatuses; a selection device that selects one of the plurality of apparatuses as the command target apparatus according to a plurality of visual line regions individually set in relation to the plurality of apparatuses and a visual line direction of the user detected by a visual line detection sensor, the one of the plurality of apparatuses relating to one of the plurality of visual line regions disposed in the visual line direction; and a selection maintaining device that maintains a selection state of the command target apparatus when the visual line direction is changed to another direction pointing to none of the plurality of visual line regions while the command target apparatus is selected.

According to the operation system configured as above, an inconvenience that a selection is cancelled each time the user turns a visual line away from a visual line region correlated with the presently selected command target apparatus can be avoided. Hence, frequencies of a trouble the user has to take by turning a visual line again to a visual line region the user has been looking at each time the user turns a visual line away from the visual line region can be reduced.

Further, the user is allowed to give a command by operating the operation device while looking away from the visual line region. Hence, a command can be given to a device more easily.

BRIEF DESCRIPTION OF DRAWINGS

The above and other objects, features and advantages of the present disclosure will become more apparent from the following detailed description made with reference to the accompanying drawings. In the drawings.

EMBODIMENTS

The inventors found a problem as follows when the related art was put into practical use. That is, in a circumstance where multiple line-of-sight regions are individually correlated with respective devices in advance, a user wishing to give a command to a desirable device turns a line of sight to a line-of-sight region correlated with the desirable device. However, once the user turns a line of sight away from the line-of-sight region the user is looking at, the command for an intended content can no longer be maintained because, for example, the command may be cancelled or another command may be executed, in which case, the user has to take a trouble of turning a line of sight again to the line-of-sight region the user has been looking at.

The present disclosure has an object to provide an operation system which makes it easier for a user to give a command to a device.

First Embodiment

Figure 1:
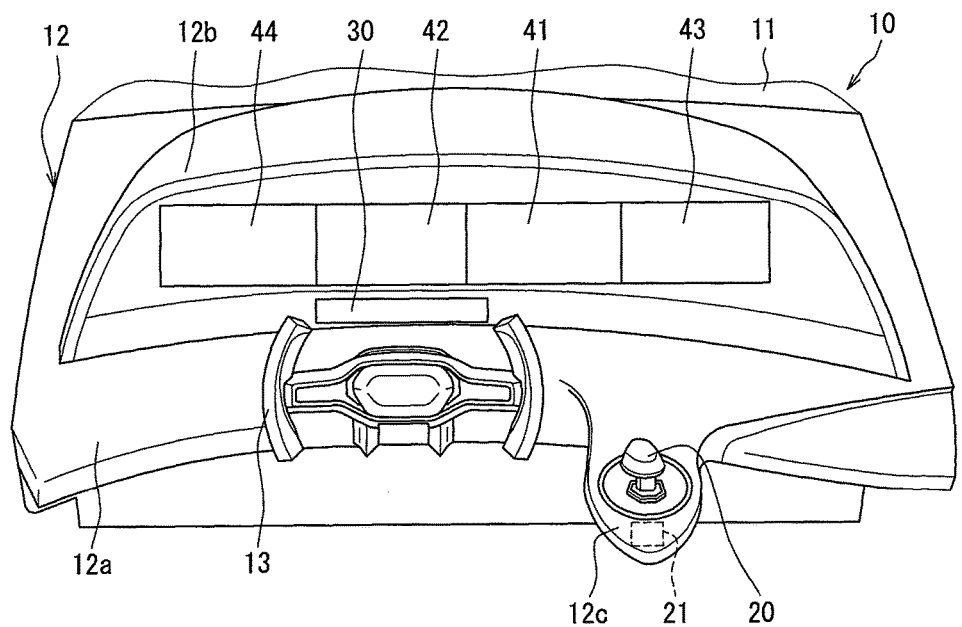
FIG. 1 is a perspective view indicating where in a vehicle an operation device and a line-of-sight detection sensor are installed in a first embodiment of the present disclosure.

FIG. 1 is a perspective view when a vehicle front side is viewed from inside a compartment of a vehicle 10. As is shown in the drawing, an instrument panel 12 made of resin is installed under a front windshield 11 in the compartment. The instrument panel 12 includes a horizontal portion 12a extending in a horizontal direction, a protrusion portion 12b protruding upward from the horizontal portion 12a, and an extension portion 12c extending vehicle rearward from the horizontal portion 12a. The protrusion portion 12b is of a shape having an opening that opens vehicle rearward, and multiple (four in an example shown in FIG. 1) display devices 41, 42, 43, and 44 are disposed in the opening. The display devices 41, 42, 43, and 44 are lined up in a right-left direction of the vehicle 10 (a right-left direction of FIG. 1).

The display devices 41, 42, 43, and 44 each include a liquid crystal panel and a backlight. The multiple display devices 41, 42, 43, and 44 are identical in shape and size. The multiple display devices 41, 42, 43, and 44 are disposed next to each other for a user to visually recognize display surfaces of the respective liquid crystal panels seamlessly in the vehicle right-left direction, that is, as a single display surface extending in the right-left direction. When viewed from in front of the instrument panel 12, a display device disposed at a center right is referred to as a first display device 41, a display device disposed at a center left is referred to as a second display device 42, a display device disposed at a right end is referred to as a third display device 43, and a display device disposed at a left end is referred to as a fourth display device 44.

Figure 2:
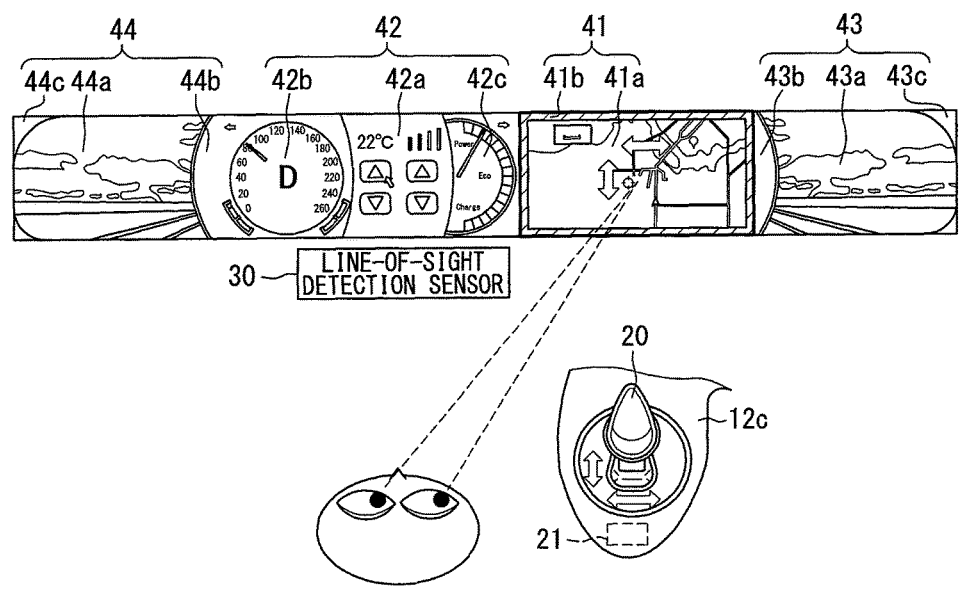
FIG. 2 is a view showing a relation of display contents of display devices shown in FIG. 1 and a direction of a line of sight of a user.

As is shown in FIG. 2, display regions in which to display information on operation contents of respective devices (see FIG. 3) described below are set in the liquid crystal panels of the display devices 41, 42, 43, and 44. The display regions are preliminarily set as line-of-sight regions 41*a*, 42*a*, 43*a*, and 44*a* correlated with the respective devices.

Figure 3:
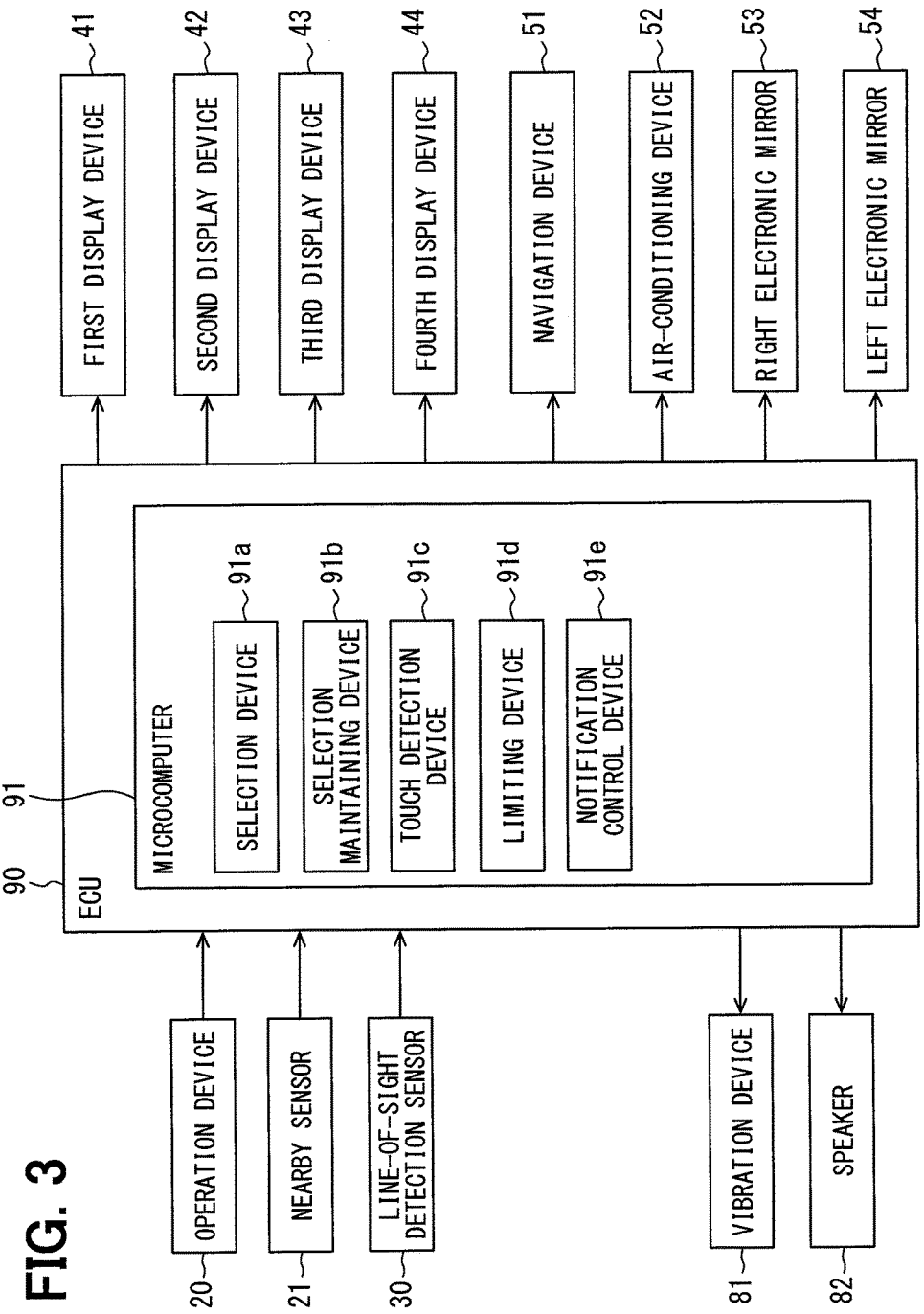
FIG. 3 is a control block diagram showing the operation device, a nearby sensor, the line-of-sight detection sensor, the display devices, and so on shown in FIG. 1.

Devices shown in FIG. 3, such as a navigation device 51, an air-conditioning device 52, a right electronic mirror 53, and a left electronic mirror 54, and unillustrated devices, such as an audio device, are installed to the vehicle 10. The navigation device 51 is a device that guides the vehicle 10 to a destination. The air-conditioning device 52 is a device that controls air conditioning in the compartment. The right electronic mirror 53 includes a camera capturing an image of an external object, such as another vehicle and a pedestrian, on a right side of the vehicle 10, and an actuator controlling an imaging direction of the camera. The left electronic mirror 54 includes a camera capturing an image of an external object on a left side of the vehicle 10, and an actuator controlling an imaging direction of the camera.

Information on an operation content of the navigation device 51 is displayed in the line-of-sight region 41*a* of the first display device 41. For example, map information, information on a present location of the vehicle 10, locational information of a destination, information on a travel path, and so on are displayed. In addition, a highlight display frame is displayed in a frame region 41*b*, which is a region of the first display device 41 other than the line-of-sight region 41*a*. The frame region 41*b* is set to an annular shape enclosing the line-of-sight region 41*a*.

Information on an operation content of the air-conditioning device 52 is displayed in the line-of-sight region 42*a* of the second display device 42. For example, information on a temperature of air-conditioning air, a volume of air, outlets, and so on is displayed. In addition, a speedometer and a battery power meter indicating a remaining amount are displayed, respectively, in meter regions 42*b* and 42*c*, which are a region of the second display device 42 other than the line-of-sight region 42*a*. The meter regions 42*b* and 42*c* and the line-of-sight region 42*a* are lined up in the vehicle right-left direction and the line-of-sight region 42*a* is disposed between the two meter regions 42*b* and 42*c*.

Information on an operation content of the right electronic mirror 53, that is, a video captured by the camera in a direction controlled by the actuator is displayed in the line-of-sight region 43*a* of the third display device 43. In addition, images (for example, black images) different from a video captured by the camera are displayed in spare regions 43*b* and 43*c*, which are a region of the third display device 43 other than the line-of-sight region 43*a*. The line-of-sight region 41*a* of the first display device 41 and the spare region 43*b* and the line-of-sight region 43*a* of the third display device 43 are lined up in the vehicle right-left direction, and the spare region 43*b* is disposed between the two line-of-sight regions 41*a* and 43*a*. Hence, the two line-of-sight regions 41*a* and 43*a* are spaced at a predetermined interval or more in the vehicle right-left direction.

Information on an operation content of the left electronic mirror 54, that is, a video captured by the camera in a direction controlled by the actuator is displayed in the line-of-sight region 44*a* of the fourth display device 44. In addition, images (for example, black images) different from a video captured by the camera are displayed in spare regions 44*b* and 44*c*, which are a region of the fourth display device 44 other than the line-of-sight region 44*a*. The line-of-sight region 42*a* of the second display device 42 and the spare region 44*b* and the line-of-sight region 44*a* of the fourth display device 44 are lined up in the vehicle right-left direction, and the spare region 44*b* is disposed between the two line-of-sight regions 41*a* and 44*a*. Hence, the two line-of-sight regions 41*a* and 44*a* are spaced at a predetermined interval or more in the vehicle right-left direction.

Besides the display devices 41, 42, 43, and 44 and the respective devices, an electronic control unit (ECU 90), an operation device 20, and a line-of-sight detection sensor 30 described below are installed to the vehicle 10. The operation system of the present embodiment includes the operation device 20, the multiple display devices 41 through 44, and the ECU 90. The operation device 20 is manually operated by the user to give a command for an operation content to a command target device selected from the multiple devices. The command target device is selected by the line-of-sight detection sensor 30 and the ECU 90.

The line-of-sight regions 41*a*, 42*a*, 43*a*, and 44*a* are set in correlation with the respective devices. More specifically, the navigation device 51 is set in correlation with the line-of-sight region 41*a* of the first display device 41. The air-conditioning device 52 is set in correlation with the line-of-sight region 42*a* of the second display device 42. The right electronic mirror 53 is set in correlation with the line-of-sight region 43*a* of the third display device 43. The left electronic mirror 54 is set in correlation with the line-of-sight region 44*a* of the fourth display device 44. When a direction of a line of sight detected by the line-of-sight detection sensor 30 is pointing to any one of the line-of-sight regions, the device correlated with the pointed line-of-sight region is selected.

The operation device 20 is disposed to the extension portion 12*c* within arm's reach of a driver (user) seated in a driver's seat of the vehicle 10. In the example shown in FIG. 1, a steering wheel 13 to steer the vehicle 10 is disposed on a left side in the vehicle right-left direction while the operation device 20 is disposed on a side opposite to the steering wheel 13 (right side). To be more exact, the operation device 20 is disposed in the compartment at a center in the vehicle right-left direction. The operation device 20 is operated by the user in three direction: an x-axis direction, a y-axis direction, and a z-axis direction. The x-axis direction is the vehicle right-left direction, the y-axis direction is a vehicle front-rear direction, and the z-axis direction is a top-bottom direction. In short, a tilting operation in the x-axis direction and the y-axis direction and a pushing operation in the z-axis direction are available.

For example, when the navigation device 51 is selected as a command target device, displays are as shown in FIG. 2. When the user makes a tilting operation by tilting the operation device 20 in the x-axis direction or the y-axis direction in the state shown in FIG. 2, a map displayed in the line-of-sight region 41*a* of the first display device 41 is scrolled from side to side or up and down (see arrows of FIG. 2). Alternatively, an icon selected from multiple icons and displayed in the line-of-sight region 41*a* is switched to another icon. When the user makes a pushing operation by pushing the operation device 20 in the z-axis direction, a presently selected icon is finalized and a command correlated with the finalized icon is outputted to the navigation device 51. The navigation device 51 operates according to the outputted command and an operation content is displayed in the line-of-sight region 41a.

In short, a manual operation on the operation device 20 includes a selecting operation to select a desirable command from multiple commands, and a finalizing operation to finalize the selected command. In an example shown in FIG. 2, the tilting operation corresponds to the selecting operation and the pushing operation corresponds to the finalizing operation.

A nearby sensor 21 is attached to the extension portion 12c of the instrument panel 12. The nearby sensor 21 varies an output signal with approach of a detection target. A microcomputer 91 of the ECU 90 detects a state of the user placing a hand on the operation device 20 according to a variance in the signal outputted from the nearby sensor 21. The microcomputer 91 detecting a state in the manner as above provides "a touch detection device 91c". The nearby sensor 21 may output an ON signal when a detection target coming near enters into a predetermined range. In such a case, the touch detection device 91c detects a state of the user placing a hand on the operation device 20 upon receipt of an ON signal.

The line-of-sight detection sensor 30 includes an infrared camera attached to the instrument panel 12 in front of the driver, and a video analyzing microcomputer. The infrared camera captures an image of right and left eyes of the driver. The microcomputer analyzes the captured image and computes a direction of a line of sight of the driver. The image may be analyzed by the microcomputer (i.e., micro comp) 91 in the ECU 90.

The microcomputer 91 in the ECU 90 selects one of the devices as a command target device according a direction of a line of sight of the user detected by the line-of-sight detection sensor 30 depending on which device corresponds to a line-of-sight region in the direction of a line of sight. The microcomputer 91 selecting a command target device in the manner as above corresponds to "a selection device 91a". For example, as is shown in FIG. 2, when a line-of-sight region in the direction of a line of sight is the line-of-sight region 41a of the first display device 41, the selection device 91a selects the navigation device 51 corresponding to the line-of-sight region 41a as a command target device.

It should be noted, however, that the selection device 91a selects a command target device in the manner as above by enabling detection of a line of sight by the line-of-sight detection sensor 30 while the touch detection device 91c is detecting a state of the user placing a hand on the operation device 20. In addition, the microcomputer 91 maintains a current selection even when the direction of a line of sight has changed to another direction pointing to none of the multiple line-of-sight regions 41a, 42a, 43a, and 44a while any one of the devices is selected as the command target device. The microcomputer 91 functioning to maintain a selection in the manner as above corresponds to "a selection maintaining device 91b".

The microcomputer 91 limits a command from the operation device 20 when a line of sight is not pointing to the line-of-sight region corresponding to the command target device. The microcomputer 91 limiting a command in the manner as above corresponds to "a limiting device 91d". For example, the limiting device 91d enables a command given by a tilting operation (selecting operation) on the operation device 20 while disabling a command given by a pushing operation (finalizing operation). Further, when a line of sight is not pointing to the line-of-sight region corresponding to the command target device for a predetermined time or longer, the limiting device 91d disables a command from the operation device 20. In short, the limiting device 91d disables both of the selecting operation and the finalizing operation.

A vibration device 81 (notification device) shown in FIG. 3 is attached to the steering wheel, the driver's seat, or the like to let the user feel a vibration. A speaker 82 (notification device) outputs an alarming sound, a voice, or the like. For example, in cases where a selection is finalized as above or a selection is changed, the user is notified of a state of each case by a vibration, an alarming sound, a voice, or the like.

The microcomputer 91 controls operations of the vibration device 81 (notification device) and the speaker 82 (notification device) to notify the user that a command is limited when a command is limited by the limiting device 91d. The microcomputer 91 controlling operations in the manner as above corresponds to "a notification control device 91e". For example, when a command is limited by the limiting device 91d, the notification control device 91e actuates the vibration device 81 attached to the driver's seat, the steering wheel, or the like or makes an announcement informing that a command is limited by outputting a voice from the speaker 82.

Figure 4:
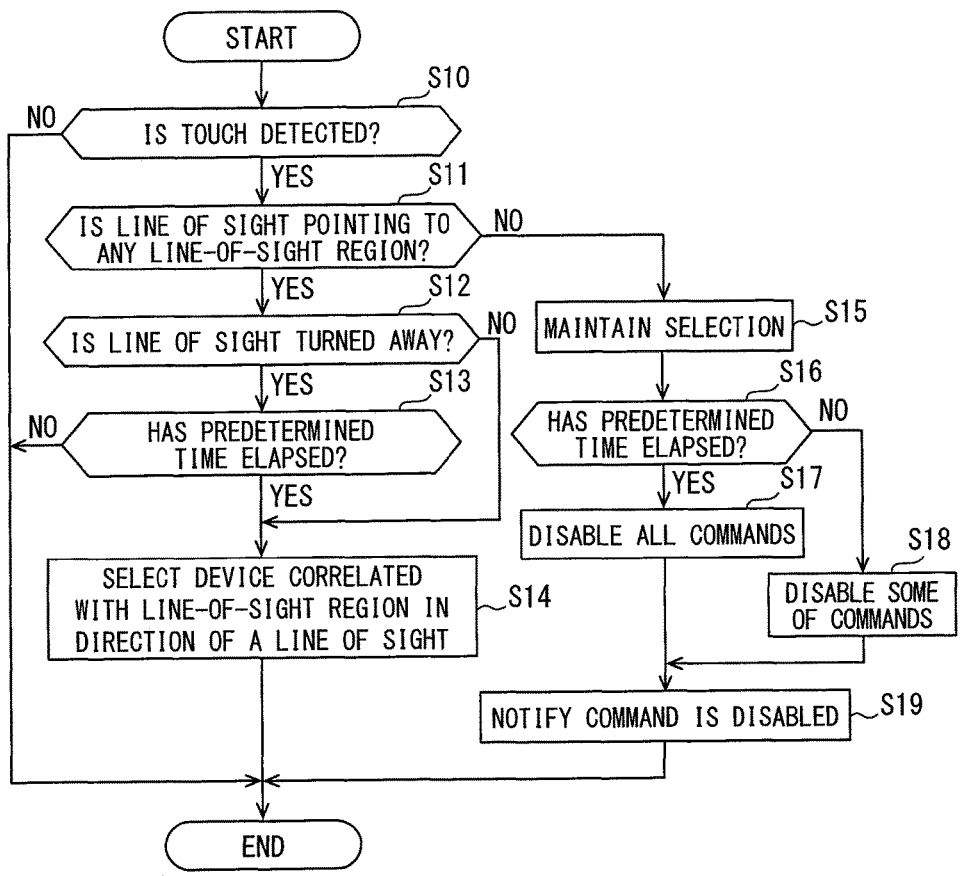
FIG. 4 is a flowchart depicting a control procedure by a microcomputer of FIG. 3.

FIG. 4 is a flowchart depicting a processing procedure executed repetitively in predetermined computation cycles by the microcomputer 91. Firstly, whether the nearby sensor 21 detects a touch is determined in Step S10. When a touch is detected, it is assumed that the user is placing a hand on the operation device 20. Hence, advancement is made to subsequent Step S11 on an assumption that the user has an intention to give a command to a desirable device by using the operation device 20. In Step S11, whether the user is looking at any one of the multiple line-of-sight regions is determined. That is, whether any line-of-sight region is in a direction of a line of sight detected by the line-of-sight detection sensor 30 is determined. More specifically, whether a direction of a line of sight is pointing to any one of the multiple line-of-sight regions 41a, 42a, 43a, and 44a is determined.

When it is determined that a line of sight is pointing to one of the line-of-sight regions, whether the line of sight is turned away is determined. More specifically, when a line-of-sight region to which the line of sight is presently pointing differs from a line-of-sight region corresponding to the presently selected device, it is determined that the line of sight is turned away. In a case where no device is selected presently, it is determined that the line of sight remains same.

In a case where it is determined that the line of sight is turned away, whether the line of sight has been turned away for a predetermined time or longer is determined in subsequent Step S13. When it is determined in Step S13 that at least the predetermined time has elapsed or it is determined in Step S12 that the line of sight remains same, advancement is made to Step S14. In Step S14, a device corresponding to the line-of-sight region in the direction of a line of sight is selected as a command target device.

When it is determined in Step S13 that the predetermined time has not elapsed, the processing is ended and returned to Step S10 without executing a selection in Step S14. When it is determined in Step S11 that the user is not looking at any one of the multiple line-of-sight regions, a selection of the presently selected device is maintained in Step S15. For example, when the user looking at a line-of-sight region corresponding to a command target device looks away ahead of the vehicle 10 through the front windshield 11, a selection of the device is maintained.

In subsequent Step S16, whether a direction of a line of sight is pointing to none of the multiple line-of-sight regions for a predetermined time or longer is determined. When it is determined that the predetermined time has elapsed, all operations on the operation device 20 are disabled in subsequent Step S17. More specifically, commands given by both a titling operation (selecting operation) and a pushing operation (finalizing operation) are disabled. When it is determined in Step S16 that the predetermined time has not elapsed, some of operations on the operation device 20 are disabled in subsequent Step S18. More specifically, a command given by a titling operation (selecting operation) is enabled while a command given by a pushing operation (finalizing operation) is disabled.

In subsequent Step S19, at least one of the vibration device 81 and the speaker 82 is operated to notify the user that a command is disabled in Step S17 or Step S18.

As has been described, the present embodiment includes the selection device 91a and the selection maintaining device 91b in addition to the operation device 20 from which a command for an operation content is given to a command target device selected from multiple devices. The selection device 91a selects one of the devices as a command target device according to a direction of a line of sight of the user detected by the line-of-sight detection sensor 30 depending on which device is correlated with one of the line-of-sight regions 41a, 42a, 43a, and 44a that is in the direction of a line of sight. The selection maintaining device 91b maintains the selection made as above even when the direction of a line of sight is turned to another direction pointing to none of the multiple line-of-sight regions 41a, 42a, 43a, and 44a while the command target device is selected.

When configured as above, an inconvenience that the selection is cancelled each time the line of sight is turned away from a line-of-sight region correlated with the presently selected command target device can be avoided. For example, in a case where the user selects the navigation device 51 by looking at the line-of-sight region 41a of the first display device 41, a selection of the navigation device 51 is maintained even when the user turns the line of sight away from the line-of-sight region 41a by looking ahead through the front windshield 11. Hence, frequencies of a trouble the user has to take by selecting the navigation device 51 by turning a line of sight again to the line-of-sight region 41a each time the user turns the line of sight away from the line-of-sight region 41a can be reduced. Further, the user is allowed to give a command by operating the operation device 20 while the user is not looking at the line-of-sight region 41a.

In addition, the present embodiment includes the limiting device 91d which limits a command from the operation device 20 when the direction of a line of sight is turned to another direction pointing to none of the multiple line-of-sight regions 41a, 42a, 43a, and 44a while a command target device is selected. According to the configuration as above, when the user looks away from the line-of-sight regions 41a, 42a, 43a, and 44a, a command from the operation device 20 is limited while the selection is maintained. Hence, for example, in a case where information on operation contents is displayed in the line-of-sight regions 41a, 42a, 43a, and 44a, a command is limited by the limiting device 91d even when the user who is not looking the displayed information makes an erroneous operation. Consequently, an operation of the device contrary to an intention of the user by an erroneous operation can be restricted.

In the present embodiment, the limiting device 91d enables a command given by the selecting operation on the operation device 20 while disabling a command given by the finalizing operation. Hence, even when the user looks away from the line-of-sight regions 41a, 42a, 43a, and 44a, the selection is maintained and the user is allowed to give a command by the selecting operation. For example, in a case where information on operation contents is displayed in the line-of-sight regions 41a, 42a, 43a, and 44a, the user is allowed to make a blind operation without looking at the displayed information, which can enhance ease of operation. Nevertheless, a command by the finalizing operation is disabled. Hence, an inconvenience that a device operates contrary to an intention of the user by an erroneous operation can be restricted.

In the present embodiment, in a case where the direction of a line of sight is in another direction pointing to none of the multiple line-of-sight regions 41a, 42a, 43a, and 44a for a predetermined time or longer while the command target device is selected, commands given by both the selecting operation and the finalizing operation are disabled. When the user is not looking at any one of the line-of-sight regions 41a, 42a, 43a, and 44a for the predetermined time or longer, the user is least likely to give a command to a desirable device by operating the operation device 20. Hence, an inconvenience that a device operates contrary to an intention of the user by an erroneous operation can be restricted further in the present embodiment where commands given by both the selecting operation and the finalizing operation are disabled in circumstances as above.

The present embodiment includes the notification control device 91e which controls operations of the vibration device 81 and the speaker 82 to notify the user that a command is limited when a command is limited by the limiting device 91d. Accordingly, by letting the user become aware that a command is limited, a possibility that the user mistakes the limitation for a failure of the operation system can be reduced.

In the present embodiment, the line-of-sight regions 41a, 42a, 43a, and 44a are individually provided to the respective devices and set in display regions where information on operation contents is displayed. Hence, the user is allowed to give a command to change an operation content or the like by manually operating the operation device 20 while looking at information on the operation contents and displayed in the line-of-sight regions. For example, in the example shown in FIG. 2, the navigation device 51 is selected as the target command device and the user is allowed to scroll map information by manually operating the operation device 20 while looking at the map information displayed in the line-of-sight region 41a. Hence, the user is allowed to give a command easily even when the device is of a type that requires a command for an intricate operation content.

Meanwhile, the user is allowed to select a command target device from the multiple devices by merely looking at the line-of-sight region corresponding to a desirable device. For example, when the user turns a line of sight to the line-of-sight region 42a of the second display device 42 while the navigation device 51 is selected as the command target device as is shown in FIG. 2, the device (air-conditioning device 52) corresponding to the second display device 42 is selected as a command target device. In short, a command as simple as selecting a command target device is realized by using the line-of-sight detection sensor 30 while a command as intricate as setting an operation content is realized by using the operation device 20. As has been described, according to the present embodiment, a command can be given to a device more easily while commands for operation contents can be given to multiple devices by using the common operation device 20.

The present embodiment includes the touch detection device 91c detecting that the user is touching the operation device 20. The selection device 91a makes a selection by enabling detection of a line of sight by the line-of-sight detection sensor 30 while the touch detection device 91c is detecting the touch on the operation device 20. Such a configuration removes a trouble that a device correlated with the line-of-sight region that happens to be in the direction of a line of sight is selected when the user is not touching the operation device 20, that is, when the user has no intention to give a command to any device.

In the present embodiment, when the line-of-sight detection sensor 30 detects that a line of sight is turned to any one of the multiple line-of-sight regions other than the line-of-sight region corresponding to the command target device, a selection of the command target device is maintained unless a line of sight has been turned away for a predetermined time or longer. Hence, a selection is not changed when the user merely looks another line-of-sight region for a reasonably short time, which allows the user to look at another line-of-sight region without changing the presently selected command target device.

The present embodiment includes the frame region 41b (selection notification display portion) notifying the user that the line-of-sight region corresponding to the command target device is selected by the selection device 91a. The user is thus able to find out easily which device is presently selected as the command target device. Consequently, a command to the device can be given more easily.

Second Embodiment

Figure 5:
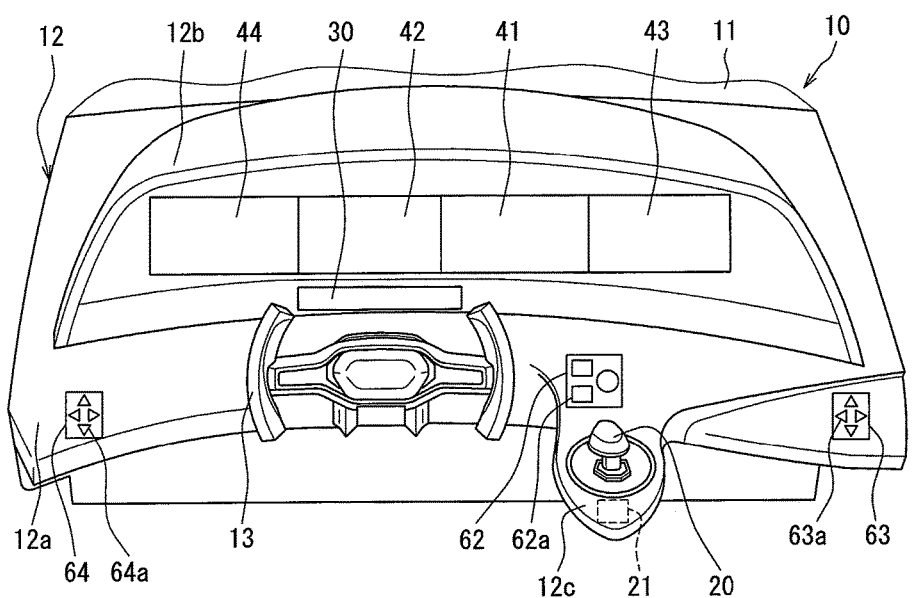
FIG. 5 is a perspective view indicating where in a vehicle an operation device and a line-of-sight detection sensor are installed in a second embodiment of the present disclosure.

In the first embodiment above, the display regions of the display devices 41, 42, 43, and 44 are set, respectively, as the line-of-sight regions 41a, 42a, 43a, and 44a individually correlated with the respective devices. In the present embodiment, line-of-sight regions 62, 63, 64 (see FIG. 5) individually correlated with respective devices are set in advance at locations of operation panels described below.

A first operation panel, a second operation panel, and a third operation panel are disposed to an instrument panel 12 under display devices 41, 42, 43, and 44. The first operation panel is set as a line-of-sight region correlated with an air-conditioning device 52 and includes operation members 62a, such as a switch and a dial, to give a command for an operation content to the air-conditioning device 52. The second operation panel is set as a line-of-sight region correlated with a right electronic mirror 53 and includes operation members 63a, such as a switch, to give a command for an operation content to the right electronic mirror 53. The third operation panel is set as a line-of-sight region correlated with a left electronic mirror 54 and includes operation members 64a, such as a switch, to give a command for an operation content to the left electronic mirror 54. The operation members 62a, 63a, and 64a are manually operated by a user.

The respective devices operate according to operations on the operation members 62a, 63a, and 64a. A device selected by a selection device 91a operates according to an operation on an operation device 20. That is, an operation system of the present embodiment includes the configuration shown in FIG. 3 in the first embodiment above and executes processing as depicted in FIG. 4 in the same manner as in the first embodiment above. Hence, an operation system of the present disclosure is also applicable to a case where the line-of-sight regions 41a, 42a, 43a, and 44a are not display regions of the corresponding display devices as described above.

Other Embodiments

While the above has described the preferred embodiments of the disclosure, it should be appreciated that the disclosure is by no means limited to the embodiments above and can be modified in various manners as described below. In addition to a combination of portions described as being feasible in respective embodiments, portions of the respective embodiments may be combined even when feasibility of such a combination is not explicitly indicated or suggested unless a trouble occurs.

The nearby sensor 21 shown in FIG. 1 and FIG. 2 may be of either a contact type or a non-contact type. Alternatively, the nearby sensor 21 may be a sensor of a type that detects a variance in magnetic field or a type that detects a variance in capacitance. An attaching position of the nearby sensor 21 is not limited to the extension portion 12c. For example, the nearby sensor 21 may be attached to the operation device 20.

The nearby sensor 21 may be omitted. In such a case, the touch detection device 91c may detect a touch when detecting an output of an input signal generated when the operation device 20 is operated. For example, the touch detection device 91c may detect a state of the user placing a hand on the operation device 20 depending on whether a tilting operation or a pushing operation is made on the operation device 20.

In the embodiments above, a command given by the selecting operation on the operation device 20 is enabled while a command given by the finagling operation is disabled while the user looks away from the visual regions 41a, 42a, 43a, and 44a. Conversely, a command given by the selecting operation by the operation device 20 may be disabled whereas a command given by the finalizing operation may be enabled under conditions same as above. The modification as above is useful when the user makes the selecting operation while looking at the line-of-sight region 41a, 42a, 43a, or 44a on a red light and makes the finalizing operation later while looking away from the line-of-sight region 41a, 42a, 43a, or 44a the user has been looking at when the light turns to green. Examples of the finalizing operation as above include but not limited to an operation to switch ON and OFF various switches and an operation to set a temperature of the air-conditioning device 52.

In the embodiment shown in FIG. 1, the display devices 41, 42, 43, and 44 are disposed in the opening of the instrument panel 12. It should be appreciated, however, that the present disclosure is not limited to such a configuration. For example, display devices may be disposed on a dashboard.

In the embodiment shown in FIG. 1, the multiple display devices 41, 42, 43, and 44 are lined up in the vehicle right-left direction. It should be appreciated, however, that the present disclosure is not limited to the alignment as above. For example, multiple display devices may be disposed at positions displaced in the top-bottom direction.

In the embodiment shown in FIG. 1, the operation device 20 is disposed to the instrument panel 12. It should be appreciated, however, that the present disclosure is not limited to such a configuration. For example, the operation device 20 may be disposed to the steering wheel 13.

Devices or functions or both provided by the ECU 90 (control device) may be provided in the form of software recorded in a physical recording medium and a computer that runs software, software alone, hardware alone, or a combination of the forgoing. For example, when the control device is provided by a circuit which is hardware, the control device may be provided by a digital circuit or an analog circuit each including a large number of logic circuits.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An operation system comprising:
a knob that is manually operated by a user and inputs a command of an operation content to a command target apparatus selected from a plurality of apparatuses;
a microcomputer configured to select one of the plurality of apparatuses as the command target apparatus according to a plurality of visual line regions individually set in relation to the plurality of apparatuses and a visual line direction of the user detected by a visual line detection sensor, the one of the plurality of apparatuses relating to one of the plurality of visual line regions disposed in the visual line direction;
the microcomputer configured to maintain a selection state of the command target apparatus when the visual line direction is changed to another direction pointing to none of the plurality of visual line regions while the command target apparatus is selected;
the microcomputer configured to limit a command from the knob when the visual line direction is changed to another direction pointing to none of the plurality of visual line regions while the command target apparatus is selected;
the microcomputer is configured to determine whether the visual line direction is pointing to none of the plurality of visual line regions for a predetermined time or longer; and
the microcomputer is configured to disable some operations and to enable other operations when the predetermined time has not elapsed.

2. The operation system according to claim 1, wherein:
a manual operation includes a selecting operation to select a desirable command from a plurality of commands, and a finalizing operation to finalize a selected command; and
the microcomputer enables a command given by the selecting operation and disables a command given by the finalizing operation.

3. The operation system according to claim 1, wherein:
a manual operation includes a selecting operation to select a desirable command from a plurality of commands, and a finalizing operation to finalize a selected command; and
the microcomputer disables both a command given by the selecting operation and a command given by the finalizing operation when the visual line direction is disposed in another direction pointing to none of the plurality of visual line regions for the predetermined time or longer while the command target apparatus is selected.

4. The operation system according to claim 1, further comprising:
a notification control device that controls an operation of a notification device to notify the user that a command is limited when the command is limited by the microcomputer.

* * * * *